(12) United States Patent
Petty

(10) Patent No.: US 6,189,319 B1
(45) Date of Patent: *Feb. 20, 2001

(54) REMOVAL OF AIR FROM HYDRAULIC SYSTEM

(75) Inventor: Jon A. Petty, Tucson, AZ (US)

(73) Assignee: Phoenix Systems, L.L.C., Tucson, AZ (US)

( * ) Notice: Under 35 U.S.C. 154(b), the term of this patent shall be extended for 0 days.

This patent is subject to a terminal disclaimer.

(21) Appl. No.: 09/284,493
(22) PCT Filed: Oct. 28, 1997
(86) PCT No.: PCT/US97/19574
  § 371 Date: Apr. 13, 1999
  § 102(e) Date: Apr. 13, 1999
(87) PCT Pub. No.: WO98/19074
  PCT Pub. Date: May 7, 1998

Related U.S. Application Data

(63) Continuation-in-part of application No. 08/744,183, filed on Nov. 5, 1996, now Pat. No. 5,899,065, which is a continuation-in-part of application No. 08/738,776, filed on Oct. 29, 1996, now Pat. No. 5,813,225, which is a continuation-in-part of application No. 08/441,187, filed on May 15, 1995, now Pat. No. 5,687,566.

(51) Int. Cl.[7] ............................................ F15B 7/10
(52) U.S. Cl. ................................... 60/584; 60/453
(58) Field of Search ..................... 60/584, 453; 188/532

(56) References Cited

U.S. PATENT DOCUMENTS

| 3,183,673 | * | 5/1965 | Schwarz | 60/584 |
|---|---|---|---|---|
| 3,561,214 | | 2/1971 | Bobst . | |
| 3,756,367 | | 9/1973 | Mitchell et al. . | |
| 4,038,823 | | 8/1977 | Mostert . | |
| 4,542,390 | | 9/1985 | Bruning et al. . | |
| 4,741,417 | | 5/1988 | Caramanna . | |
| 4,785,629 | | 11/1988 | Ennis, III et al. . | |
| 4,842,107 | * | 6/1989 | Buchanan et al. | 60/584 |

FOREIGN PATENT DOCUMENTS

| 669200 | * | 8/1963 | (CA) | 188/352 |
|---|---|---|---|---|
| 1405591 | * | 9/1975 | (GB) | 60/585 |
| 1463502 | | 2/1977 | (GB) . | |

* cited by examiner

Primary Examiner—F. Daniel Lopez
(74) Attorney, Agent, or Firm—Antonio R. Durando

(57) ABSTRACT

An arrangement for removing contaminants from a hydraulic system includes a portable fluid pump for introducing fluid into or evacuating fluid from the hydraulic system and a resilient adapter capable of conforming to openings of different size in the hydraulic system and provide a sealed fluid connection between the pump and the hydraulic system. Contaminants are removed by applying the resilient adapter to an opening in the hydraulic system to provide a sealed fluid connection and by either introducing fluid into the hydraulic system or evacuating fluid from the hydraulic system, as appropriate to effect the removal of contaminants from the system.

12 Claims, 11 Drawing Sheets

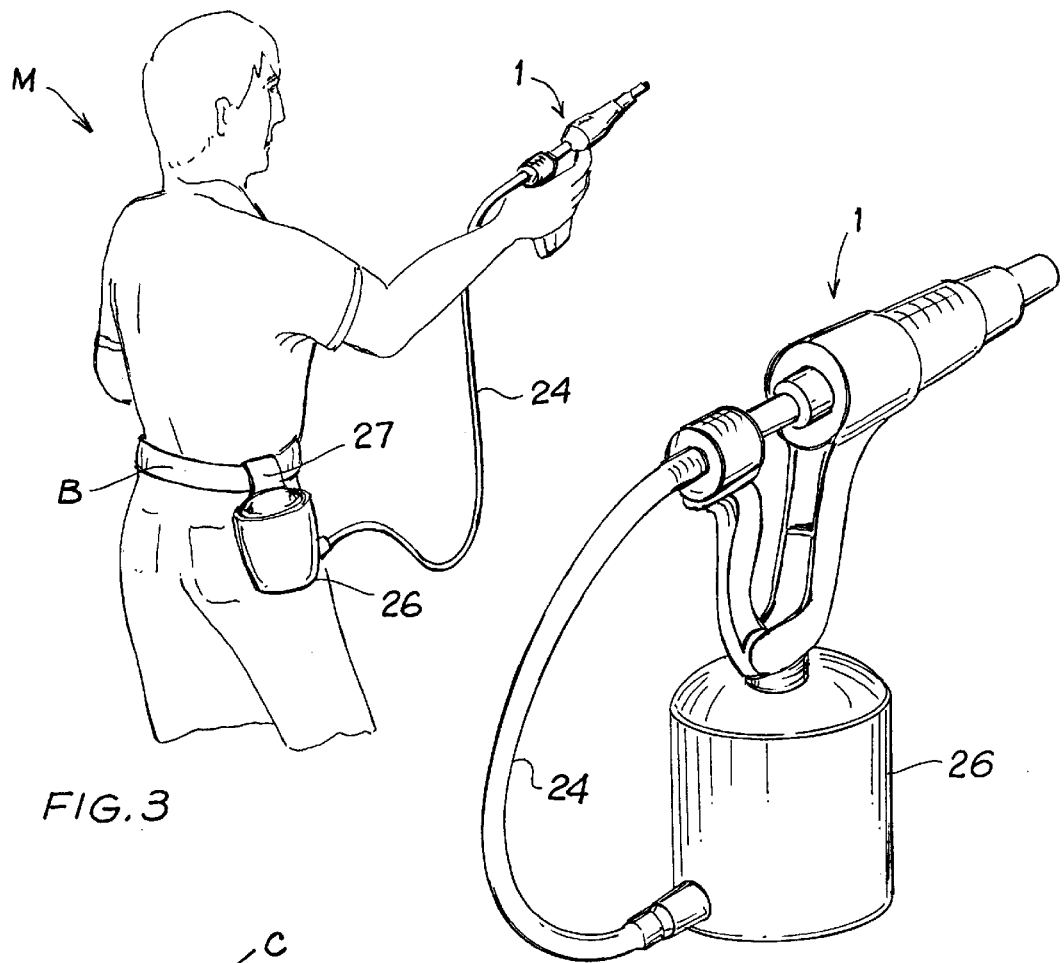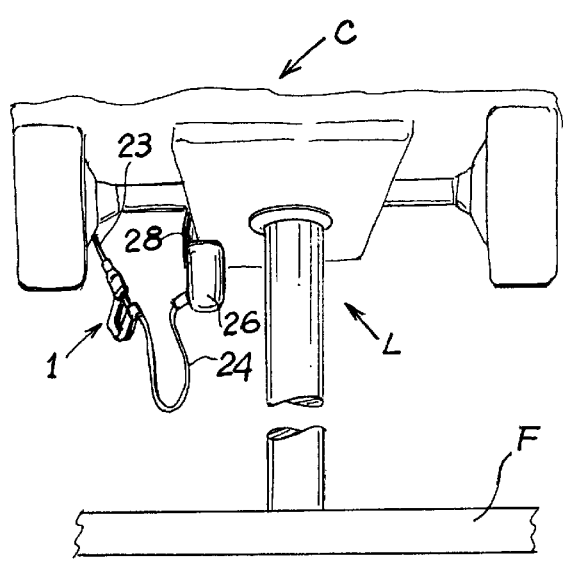
FIG. 3
FIG. 5
FIG. 4

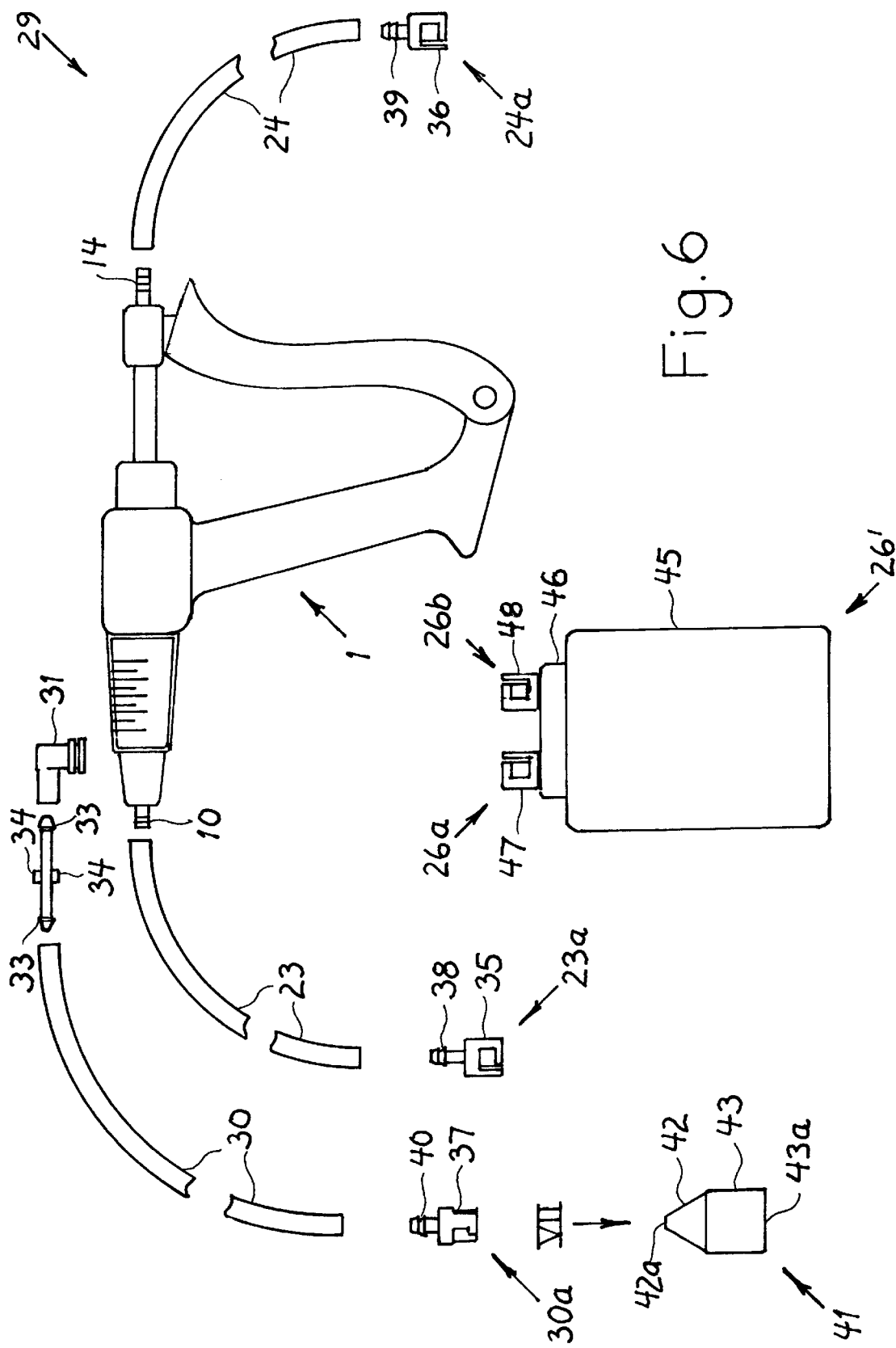

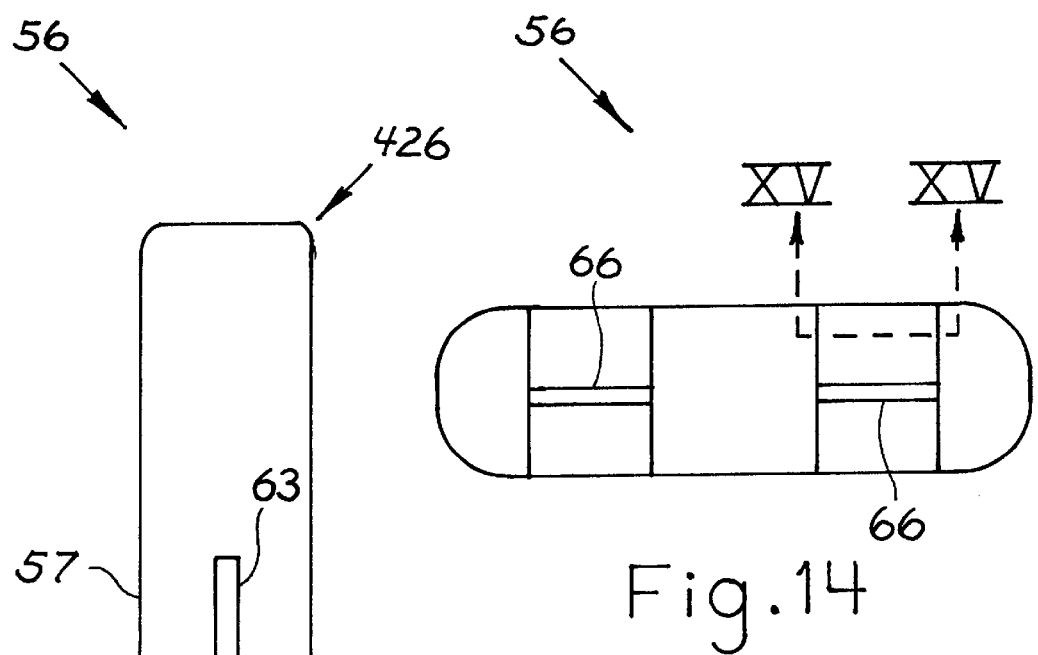
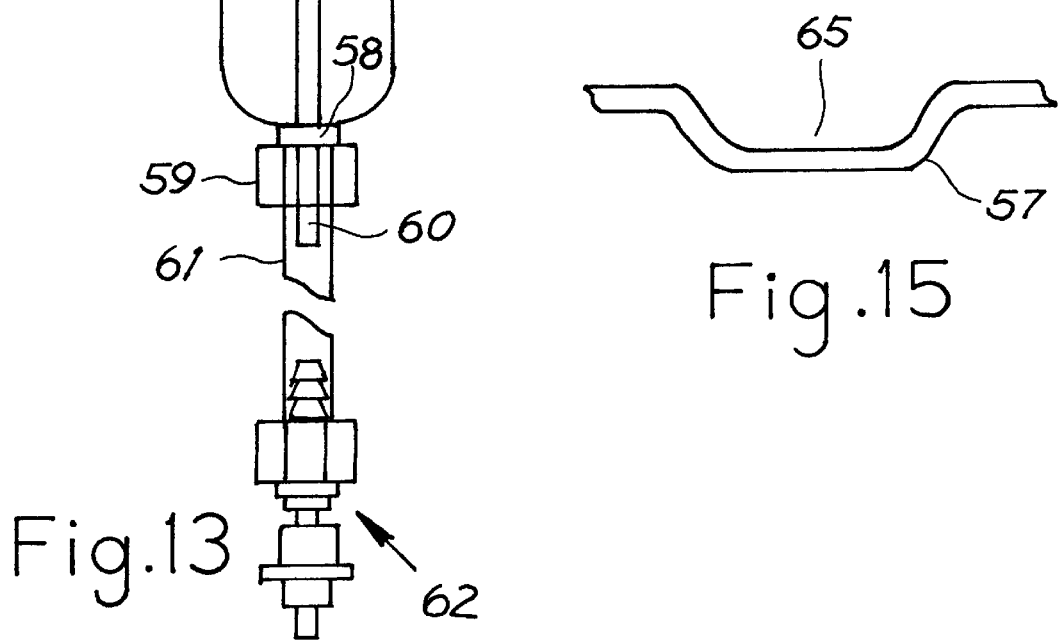
Fig.13  Fig.14  Fig.15

REMOVAL OF AIR FROM HYDRAULIC SYSTEM

REFERENCE TO RELATED APPLICATIONS

This appliation is related to International Application PCT/US97/19574, filed Oct. 28, 1997, and is a continuation-in-part application of U.S. Ser. 08/744,183, filed Nov. 5, 1996, U.S. Pat. No. 5,899,065, which is a continuation-in-part application of Ser. No. 08/738,776, filed Oct. 29, 1996, U.S. Pat. No. 5,813,225, which is a continuation-in-part application of Ser. No. 08/441,187, filed May 15, 1995, U.S. Pat. No. 5,687,566.

BACKGROUND OF THE INVENTION

1. Field of the Invention

The invention relates to the removal of contaminants from a hydraulic system.

2. Description of the Prior Art

The braking system of a motor vehicle is generally bled by opening the bleed valve for each brake individually and pumping the brakes. This procedure not only requires two people but is also very time-consuming.

These drawbacks are overcome by U.S. Pat. No. 4,038,823 in which a reciprocating pump is used to pump brake fluid into the servo cylinders of the braking system. Bleeding of a brake is complete when clear brake fluid enters the reservoir of the master cylinder. In order for the person bleeding the brakes to ascertain that clear brake fluid is entering the reservoir, a long feed line must be provided from the pump to the brake being bled. This is cumbersome.

U.S. Pat. No. 4,741,417 employs a motor-driven rotary pump for bleeding a braking system. The pump inlet is immersed in the reservoir of the master cylinder while the pump outlet is connected to a manifold. Flexible hoses lead from the manifold to the bleed valves of the respective servo cylinders. In operation, brake fluid is pumped from the reservoir to the servo cylinders via the manifold and the flexible hoses. The brake fluid returns to the reservoir through the brake lines of the braking system. This arrangement is complicated and, in addition, requires considerable time to set up.

U.S. Pat. No. 4,785,629 eliminates these problems by injecting brake fluid into the servo cylinders via a syringe. However, the syringe is associated with its own difficulties. To begin with, two hands are required to operate the syringe. Furthermore, the syringe cannot be very large since otherwise the force necessary to operate the syringe becomes excessive. Due to the limited size of the syringe, the syringe must be refilled frequently thereby increasing the time to bleed the braking system. In addition, the refilling operation requires disconnection of the syringe from the brake system and the attendant risk of introducing air upon reconnection. Moreover, following the injection of brake fluid with the syringe, the master cylinder must be observed to insure that all air bubbles are dissipated. Finally, as a practical matter people tend to impart too much force to the syringe at the beginning of each bleeding operation and cause rapid flow and upward splashing and/or spilling of fluid from the master cylinder.

Prior application Ser. No. 08/441,187 discloses a portable pump or fluid conveying device which is simpler and quicker than the syringe. Although the pump operates very satisfactorily, it has been found that certain improvements would be beneficial. For instance, the prior application fails to teach a convenient manner of priming the pump.

Moreover, while the prior application discloses pressure bleeding, there are situations where vacuum bleeding, either alone or in combination with pressure bleeding, yields best results. Accordingly, it would be of advantage if the pump could be easily switched back-and-forth. Furthermore, although the prior application shows the pump connected to the servo cylinder of a brake system, pressure bleeding through a master cylinder reservoir is recommended under certain circumstances. However, since different reservoirs have openings of different size, it is not possible to employ the pump for a variety of reservoirs.

In addition, a problem exists with the portable pump as well as with other arrangements for bleeding or flushing hydraulic systems. This is the lack of any provision for protecting hydraulic fluid from air when hydraulic fluid is delivered to a hydraulic system. Thus, hydraulic fluid tends to deteriorate when it comes into contact with air. The improvements addressed in this application are directed at solving these problems.

SUMMARY OF THE INVENTION

It is an object of the invention to provide an arrangement which allows a fluid conveying device to be conveniently primed.

Another object of the invention is to provide an arrangement which can easily adapt a fluid conveying device to apply either pressure or suction to a hydraulic system.

An additional object of the invention is to provide an arrangement which permits a fluid conveying device to be adjusted to openings of different size.

A further object of the invention is to provide a relatively simple method of priming a fluid conveying device.

One more object of the invention is to provide a relatively quick method of switching a fluid conveying device between pressurization and suctioning of a hydraulic system.

Yet another object of the invention is to provide a method which makes it possible for a fluid conveying device to pressurize hydraulic systems through openings of different size.

It is also an object of the invention to package hydraulic fluid in a manner which makes it possible to limit exposure of the hydraulic fluid to air during delivery to a hydraulic system.

Finally, another object of the invention is to provide a method which enables hydraulic fluid to be supplied to a hydraulic system while inhibiting contact of the hydraulic fluid with air.

The preceding objects, as well as other which will become apparent as the description proceeds, are achieved by the invention.

One aspect of the invention resides in an arrangement for removing contaminants from a hydraulic system. The arrangement comprises a portable fluid conveying device for introducing fluid into or evacuating fluid from the hydraulic system, and the device has an inlet and an outlet.

In one embodiment, the arrangement further comprises a first conduit connectible with the inlet, a second conduit connectible with said outlet, and a portable container for fluid introduced into or discharged from the hydraulic system. The container has a first opening for fluid and a second opening for fluid, and the first conduit is connectible with one of the openings whereas the second conduit is connectible with the other of the openings.

When the first conduit is connected to the inlet of the fluid conveying device and to one opening of the container while the second conduit is connected to the outlet of the device and to the other opening of the container, a flow path through the device is established. This permits the fluid conveying device to be primed in a convenient manner with fluid from the container.

Another embodiment of the arrangement comprises a first conduit connectible with the inlet of the fluid conveying device, a second conduit connectible with the outlet of the device, and a third conduit connectible with the hydraulic system. This embodiment additionally comprises a first coupling element for the first conduit, a second coupling element for the second conduit, and a third coupling element for the third conduit. The third coupling element is complementary to both the first and second coupling elements.

Since the third coupling element is complementary to the first coupling element as well as the second coupling element, the third conduit can be connected to each of the first and second conduits. The third conduit, which is connectible to the hydraulic system, may consequently be coupled to either the inlet or the outlet of the fluid conveying device. The fluid conveying device can thus be readily made to apply pressure or suction to the hydraulic system.

An additional embodiment of the arrangement comprises a resilient adapter for the fluid conveying device to allow the latter to charge fluid through openings of different size.

The resilient adapter enables the fluid conveying device to be adjusted to openings of various sizes. This makes it possible to use the device for different types of hydraulic systems.

Still another aspect of the invention resides in a hydraulic fluid packet. The packet comprises a container including at least one receptacle, and hydraulic fluid in the receptacle. The receptacle is collapsible in response to withdrawal of the hydraulic fluid from the receptacle.

If the receptacle is allowed to collapse onto the hydraulic fluid as the hydraulic fluid is evacuated, the formation of air pockets adjacent the hydraulic fluid is inhibited thereby limiting exposure of the hydraulic to air.

Another aspect of the invention resides in a method of removing contaminants from hydraulic systems.

One embodiment of the method comprises the steps of admitting fluid into a portable container, priming a portable fluid conveying device from the container, and connecting the device to a hydraulic system. The connecting step preferably includes establishing communication between the container and the system.

A further embodiment of the method comprises the steps of providing a fluid conveying device having an inlet and an outlet, connecting the inlet to a source of fluid, connecting the outlet to a hydraulic system, and introducing fluid from the source into the system using the device. This embodiment also comprises the steps of disconnecting the inlet from the source, disconnecting the outlet from said system, connecting the inlet to a hydraulic system, and evacuating fluid from such system using the fluid conveying device.

An additional embodiment of the method relates to the removal of contaminants from a first hydraulic system having a first opening of first size and a second hydraulic system having a second opening of second size. Such embodiment comprises the steps of providing a fluid conveying device having an outlet, adapting the outlet to the first opening, pressurizing the first system using the device, adapting the outlet to the second opening, and pressurizing the second system using the device.

Another aspect of the invention resides in a method of removing contaminants from at least one hydraulic system using a collapsible hydraulic fluid packet. The method comprises the steps of transferring hydraulic fluid from a receptacle to the hydraulic system, and collapsing the receptacle in response to withdrawal of the hydraulic fluid from the receptacle.

The receptacle has an outlet opening for the hydraulic fluid and the method may further comprise the step of suspending the receptacle with the outlet opening facing down prior to the transferring step.

The transferring step can involve pumping the hydraulic fluid from the receptacle to the hydraulic system and the pumping is preferably performed by hand.

Additional features and advantages of the invention will be forthcoming from the following detailed description of preferred embodiments when read in conjunction with the accompanying drawings.

BRIEF DESCRIPTION OF THE DRAWINGS

FIG. 3 shows a hydraulic fluid container which is connected to the pump of FIG. 1 and is attached to the belt of a mechanic.

FIG. 4 illustrates a hydraulic fluid container which is connected to the pump of FIG. 1 and is mounted on a motor vehicle.

FIG. 5 is a perspective view of the pump of FIG. 1 constructed as a unit with a hydraulic fluid container.

FIG. 6 shows a kit in accordance with the invention for introducing fluid into and evacuating fluid from hydraulic systems.

FIG. 13 is a side view of the container of FIG. 12.

FIG. 14 is an end view of the container of FIG. 12 as seen in the direction of the arrow XIV.

FIG. 15 is a fragmentary sectional view as seen in the direction of the arrows XV—XV of FIG. 14.

DESCRIPTION OF THE PREFERRED EMBODIMENTS

The pump or fluid conveying device of prior application Ser. No. 08/441,187 is described below with reference to FIGS. 1–5.

Figure 1:
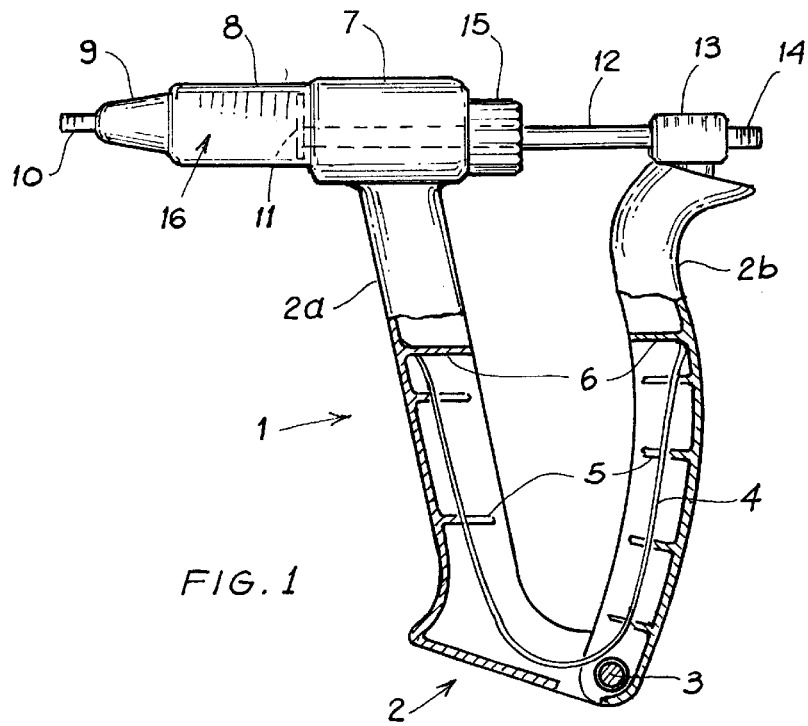
FIG. 1 is a partly broken away side view of a pump according to the invention for introducing fluid into a hydraulic system.

In FIG. 1, the numeral 1 generally identifies a pump or fluid conveying device for introducing fluid into or evacuating fluid from a hydraulic system. The pump 1, which is a reciprocating hand pump, has a handle 2 which is made up of two parts 2a and 2b. The handle parts 2a,2b are pivotally connected to one another by a pivot 3. A U-shaped spring 4 is located internally of the handle 2 and runs between the handle parts 2a,2b. The spring 4 is maintained in a predetermined position by U-shaped guides 5 molded into the handle 2 and by strip-like abutments 6 disposed in the handle 2 adjacent the ends of the spring 4. The spring 4 urges the handle parts 2a,2b away from one another.

A cylindrical mechanism housing 7 is fixed to the end of the handle part 2a remote from the pivot 3. The mechanism housing 7, which is open at either end thereof, carries a cylindrical injection or pumping housing 8. The injection housing 8, which is transparent and opens to the mechanism housing 7, has an extension 9 with a longitudinal passage. The injection housing 8 is normally sealed from this passage by a check valve located in the passage. The passage extends from the injection housing 8 to a tubular protrusion 10 which projects from the extension 9 and constitutes an outlet of the pump 1. The injection housing 8 accommodates a piston or plunger 11 which is mounted on one end of a rigid tube 12. The tube 12 defines a flow passage which is open at both ends, and the plunger 11 has a central opening in register with the flow passage. The end of the tube 12 remote from the plunger 11 is fast with an inlet housing 13 which opens to the flow passage in the tube 12. A check valve normally seals the inlet housing 13 from the flow passage in the tube 12. A tubular projection 14 extends from the inlet housing 13 and constitutes an inlet of the pump 1.

The plunger 11 is provided with a peripheral seal which extends circumferentially, and bears against the internal surface, of the injection housing 8. The seal prevents fluid which enters the injection housing 8 from flowing into the mechanism housing 7.

The inlet housing 13 is seated on the end of the handle part 2b remote from the pivot 3. The inlet housing 13 and the handle part 2b engage one another in such a manner that the inlet housing 13 and the handle part 2b can undergo limited relative pivotal movement about an axis parallel to the pivot 3.

A hollow cylindrical adjusting member is accommodated in the mechanism housing 7 and surrounds the tube 12. The adjusting member has a knurled end 15 which extends from the end of the mechanism housing 7 remote from the injection housing 8. The knurled end 15 can be rotated to change the position of the plunger 11 in the injection housing 8 and therefore the volume displaced by each stroke of the plunger 11. The end of the adjusting member remote from the knurled end 15 is provided with a collar, and a washer is mounted on either side of the collar. One of the washers confronts the plunger 11 and prevents the latter from receding into the mechanism housing 7. The other washer holds the adjusting member in the mechanism housing 7 and, to this end, bears against a series of abutments which are distributed circumferentially of the mechanism housing 7 internally thereof.

The injection housing 8 is provided with a series of graduations 16. Since the injection housing 8 is transparent, the graduations 16 allow a user of the pump 1 to measure the amount of fluid discharged through the pump outlet 10.

Assuming that no fluid is initially present in the pump 1 and that the pump inlet 14 is connected to a source of fluid, the pump 1 operates as follows:

A user grasps the pump 1 in one hand. Normally, the user will hold the pump 1 in such a manner that the thumb applies pressure against the side of the handle part 2b which faces away from the handle part 2a. The remaining four fingers then apply pressure against the side of the handle part 2a which faces away from the handle part 2b.

The user now squeezes to draw the handle parts 2a,2b towards one another against the bias of the spring 4. The squeezing action causes relative pivotal movement of the handle parts 2a,2b about the pivot 3, as well as pivotal movement of the inlet housing 13 with respect to the handle part 2b.

Movement of the handle parts 2a,2b towards one another results in displacement of the plunger 11 relative to the injection housing 8. The displacement is such that the plunger 11 and the extension 9 of the injection housing 8 approach one another.

When the plunger 11 and the end of the injection housing 8 adjacent the extension 9 come into abutment, the pressure on the handle parts 2a,2b is relaxed. The handle parts 2a,2b then return to their initial relative position under the action of the spring 4. The plunger 11 and extension 9 likewise move back to their initial relative position.

During the squeezing phase, the check valve for the tube 12 remains closed while the check valve for the extension 9 opens. Thus, fluid is unable to enter the injection housing 8 via the tube 12 but can be discharged from the injection housing 8 through the extension 9. However, since it was assumed that there was initially no fluid in the pump 1, no fluid is discharged from the pump 1 during the first squeezing phase.

During the relaxation phase, the check valve for the tube 12 opens whereas the check valve for the extension 9 closes. Consequently, fluid can flow through the pump inlet 14, the inlet housing 13, the tube 12 and the plunger 11 into the injection housing 8. Fluid is drawn into the injection housing 8 because the movement of the plunger 11 and the extension 9 away from one another, in conjunction with the closing of the check valve for the extension 9, creates a vacuum in the injection housing 8. The fluid drawn into the injection housing 8 is unable to exit the latter because the check valve for the extension 9 is closed. The check valve for the tube 12 closes at the end of the relaxation phase.

When the handle 2 of the pump 1 is now squeezed for a second time, the fluid previously drawn into the injection housing 8 is expelled from the pump 1. Thus, the check valve for the extension 9 opens and the plunger 11 forces the fluid through the extension 9 and the pump outlet 10. The expelled fluid is replaced during the following relaxation phase.

By rotating the knurled end 15 of the adjusting member, the plunger 11 can be moved towards and away from the extension 9. The effective volume of the injection housing 8, and hence the volume of fluid drawn into and expelled from the pump 1, can be changed in this manner. The graduations 16 permit a user to set the effective volume of the injection housing 8 with a good degree of precision and to measure the quantity of fluid discharged from the pump 1.

Figure 2:
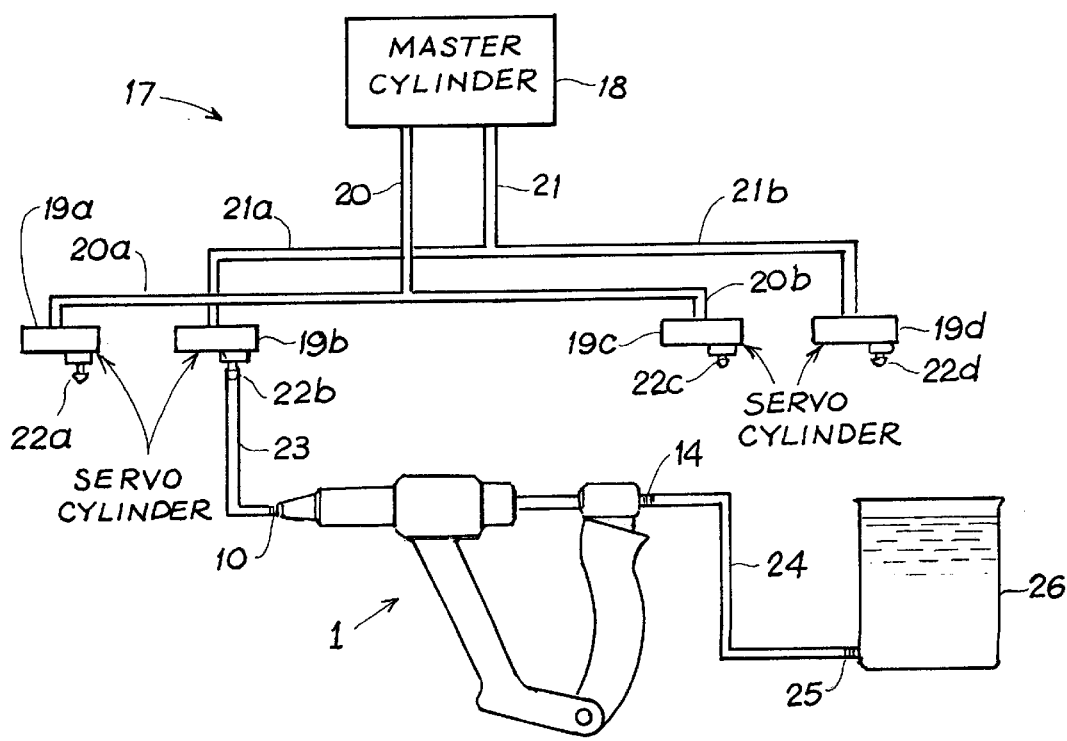
FIG. 2 schematically illustrates the pump of FIG. 1 during the removal of gas from a hydraulic system.

Referring to FIG. 2, the numeral 17 generally identifies a hydraulic system. The hydraulic system 17, which is here assumed to be the braking system of an automobile, includes a master cylinder 18 and four servo or slave cylinders 19a, 19b, 19c and 19d. Each of the servo cylinders 19a–19d operates a respective brake of the automobile.

The master cylinder 18 has two supply lines 20 and 21. The servo cylinders 19a and 19c are connected to the supply line 20 by way of respective branch lines 20a and 20b whereas the servo cylinders 19b and 19d are connected to the supply line 21 by way of respective branch lines 21a and 21b.

In order to purge air from the braking system 17, the servo cylinders 19a–19d are provided with bleed valves 22a, 22b, 22c and 22d, respectively. Currently, the purging of air from the braking system 17 is usually accomplished by having a first person depress the brake pedal while a second person opens the bleed valves 22a–22d one-by-one. Aside from tying up two people, this procedure is very time-consuming and it has been found more effective to feed brake fluid towards the master cylinder 18 via the bleed valves 22a–22d.

This manner of removing air from the braking system 17 is illustrated in FIG. 2 where the outlet 10 of the pump 1 is connected with the bleed valve 22b of the servo cylinder 19b by a hose or section of tubing 23. A second hose or section of tubing 24 connects the inlet 14 of the pump 1 to an outlet 25 of a container 26 which holds a supply of brake fluid.

Normally, the reservoir for the master cylinder 18 is empty or nearly so after the brakes have been serviced. Assuming this to be the case, and assuming that all of the bleed valves 22a–22d are closed, the braking system 17 is purged of air as follows in accordance with the invention:

The bleed valve 22a is opened and is connected by the tubing 23 to the outlet 10 of the pump 1. The inlet 14 of the pump 1 is connected by the tubing 24 to the outlet 25 of the container 26. A quantity of brake fluid equal to the volume of the servo cylinder 19a plus the volume of its branch line 20a is then pumped through the bleed valve 22a. As a result, the portion of the hydraulic system 17 between the bleed valve 22a and the feed line 20 is purged of air. The graduations 16 make it possible to determine when the amount of brake fluid pumped through the bleed valve 22a equals the volume of the servo cylinder 19a plus the volume of the branch line 20a.

Once this amount of brake fluid has been pumped through the bleed valve 22a, the tubing 23 is disconnected from the bleed valve 22a and the latter is closed. The bleed valve 22b is opened and connected to the tubing 23. A quantity of brake fluid equal to the volume of the servo cylinder 19b plus the volume of its branch line 21a is thereupon pumped through the bleed valve 22b thereby forcing out air from the portion of the hydraulic system 17 between the bleed valve 22b and the feed line 21.

After the proper quantity of brake fluid has been pumped through the bleed valve 22b, the tubing 23 is removed from the bleed valve 22b. The bleed valve 22b is closed, the bleed valve 22c opened and the tubing 23 connected to the bleed valve 22c. A quantity of brake fluid equal to the volume of the servo cylinder 19c plus the volume of its branch line 20b plus the volume of the feed line 20 is now pumped through the bleed valve 22c. Consequently, the portion of the hydraulic system 17 between the bleed valve 22c and the master cylinder 18 is cleared of air. Since air was previously removed from the portion of the hydraulic system 17 between the bleed valve 22a and the feed line 20, no air remains trapped between the master cylinder 18 and the bleed valves 22a and 22c.

When the introduction of brake fluid into the bleed valve 22c has been completed, the tubing 23 is disconnected from the bleed valve 22c which is thereafter closed. The bleed valve 22d is opened and the tubing 23 connected thereto. A quantity of brake fluid equal to the volume of the servo cylinder 19d plus the volume of its branch line 21b plus the volume of the feed line 21 is then pumped through the bleed valve 22d. This purges the portion of the hydraulic system 17 between the bleed valve 22d and the master cylinder 18 of air. Inasmuch as air has already been forced out of the portion of the hydraulic system 17 between the bleed valve 22b and the feed line 21, air is no longer present between the master cylinder 18 and the bleed valves 22b and 22d.

After the requisite amount of brake fluid has been pumped through the bleed valve 22d, the tubing 23 is removed from the bleed valve 22d and the bleed valve 22d is closed. This finishes the operation of removing air from the braking system 17.

Thus, according to the invention, a measured amount of brake fluid equal to the volume of the servo cylinders 19a–19d plus the volume of the feed lines 20,21 plus the volume of the branch lines 20a,20b,21a,21b is pumped into the braking system 17. This ensures, without the need to look for air bubbles, that the braking system 17 is thoroughly purged of air.

The pump 1 and the container 26 are preferably portable so that a user can easily carry the pump 1 and the container 26 from one of the servo cylinders 19a–19d to the other.

In order to facilitate carrying of the pump 1 and the container 26 from location to location, the container 26 can be provided with a device for securing the container 26 to an article of wear of a user. This is illustrated in FIG. 3 where M denotes a mechanic and B a belt worn by the mechanic M. A clip 27 is mounted on the container 26 and allows the latter to be clipped to the belt B of the mechanic M. The clip 27 not only makes it easier for the mechanic M to carry around the container 26 but also makes it unnecessary for the mechanic M to hold the container 26, or to set down the container 26, during the removal of air from the braking system 17.

To further facilitate carrying of the pump 1, the container 26 can be provided with a non-illustrated hook for hanging the pump 1 on the container 26.

FIG. 4 shows a car C which is being held in an elevated position by a hydraulic lift L anchored in a foundation F. In FIG. 4, the container 26 is formed with a permanent magnet 28 which allows the container 26 to be suspended from the car C in the vicinity of the bleed valve connected to the pump 1.

The tubing 23 can be dispensed with. Moreover, as illustrated in FIG. 5, it is possible to construct the pump 1 and the container 26 as a unit.

The pump 1 can be used for hydraulic systems other than braking systems, e.g., clutch systems. Furthermore, the pump 1 can be used to purge individual components of a hydraulic system such as, for instance, a brake master cylinder, a clutch master cylinder or a clutch servo cylinder.

Among the advantages achievable with the pump 1 are the following:

1. The removal of gas from a hydraulic system can be accomplished by a single individual without a need to check for gas bubbles. Thus, by matching the quantity of hydraulic fluid pumped to the volume to be purged, thorough purging is assured.
2. The removal of gas from a hydraulic system can be carried out with relative ease. Knowing the volume to be purged and the capacity of the pump 1, it is simply necessary to count the number of strokes which yield a volume of hydraulic fluid equal to the volume to be purged.
3. The pump 1 can be manufactured relatively inexpensively.

4. The removal of gas from a hydraulic system can be completed relatively quickly. On the one hand, it has been found that it is much less time-consuming to introduce hydraulic fluid into the bleed valves 22a–22d than to open the bleed valves 22a–22d and depress the brake pedal. On the other hand, the pump 1 refills automatically after each stroke so that little time is lost in recharging the pump 1.
5. The pump 1 can be operated with one hand thereby leaving one hand free for other tasks.
6. The pump 1 does not require a complicated set-up.
7. If necessary or desirable, it is a simple matter to draw fluid from a hydraulic system by reversing the pump 1.
8. The pump 1 is highly maneuverable and can be readily manipulated within the restricted spaces frequently present around hydraulic systems.
9. The clip 27 and magnet 28 permit the container 26 to be positioned close to the working area so that the sections of tubing 23 and 24 can be relatively short. This further enhances maneuverability.
10. In a facility where air is to be removed from the hydraulic systems of a large number of cars, a mechanic can carry the pump 1 and the container 26 from car to car and work on many cars in sequence.
11. The pump 1 does not require refilling during normal operation, thereby eliminating the risk of introducing air into the hydraulic system.

Referring to FIG. 6, a kit or arrangement for removing contaminants from a hydraulic system is denoted by the numeral 29. The kit 29 includes the pump or fluid conveying device 1 for introducing fluid into and evacuating fluid from a hydraulic system. The kit 29 further includes the tubing 23, the tubing 24 and a portable hydraulic fluid container 26'. The kit 29 also includes at least one additional hose or section of tubing 30, at least one fitting 31 for coupling the tubing 30 to a bleed valve of a hydraulic system, and at least one connector 32 for connecting the fitting 31 to the tubing 30. The connector 32, which is elongated and is provided with a longitudinally extending passage, has a collar 33 at either end thereof. Stops or abutments 34 are located at the middle of the connector 32.

The kit 29 additionally includes a quick-disconnect coupling element 23a for the tubing 23, a quick-disconnect coupling element 24a for the tubing 24 and a quick-disconnect coupling element 30a for the tubing 30. The coupling element 30a is complementary to the coupling element 23a as well as the coupling element 24a, that is, the coupling element 30a can form a connection with both the coupling element 23a and the coupling element 24a. The coupling elements 23a,24a,30a have respective coupling portions 35,36,37 and respective stems 38,39,40 which are receivable in the sections of tubing 23,24,30. The coupling portion 37 of the coupling element 30a is designed to mate with the coupling portions 35,36 of the coupling elements 23a,24a.

Figure 7:
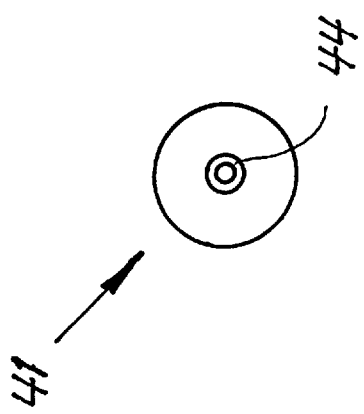
FIG. 7 is an end view of an adapter forming part of the kit of FIG. 6 as seen in the direction of the arrow VII in FIG. 6.

The kit 29 also includes an adapter 41 for the pump 1. Turning to FIG. 7 in conjunction with FIG. 6, the adapter 41 has a resilient frustoconical portion 42 and a cylindrical or annular portion 43 which is integral with the frustoconical portion 42.

The frustoconical portion 42 has a resilient exposed end face 42a while the cylindrical portion 43 has an exposed end face 43a which faces in the opposite direction from the end face 42a. A passage 44 extends longitudinally of the adapter 41 through the frustoconical portion 42 and the cylindrical portion 43. The passage 44 is designed to receive the outlet 10 of the pump 1 with a friction fit.

Figure 8:
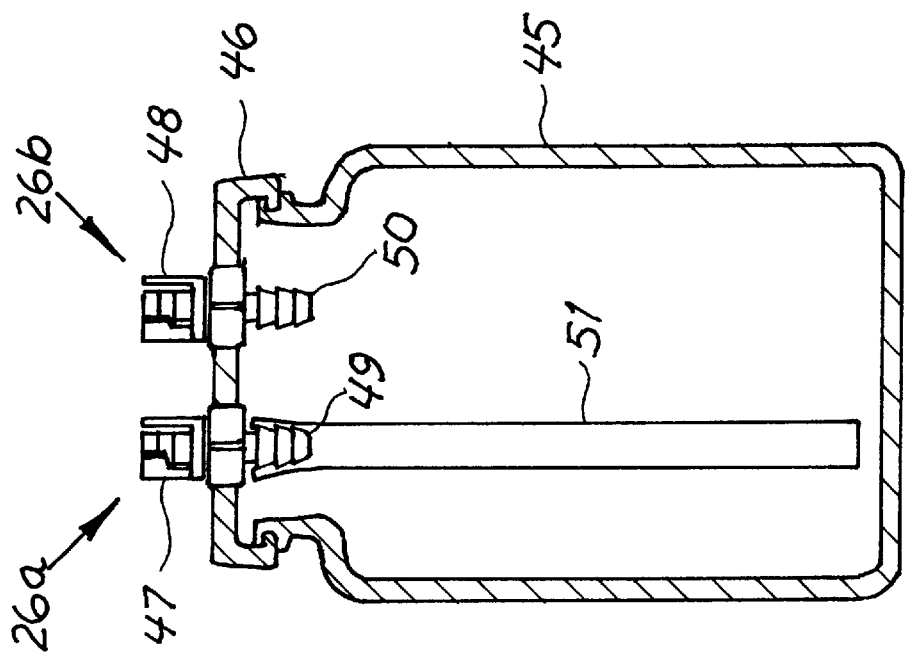
FIG. 8 is a sectional view of a hydraulic fluid container forming part of the kit of FIG. 6.

Considering FIG. 8 together with FIG. 6, the container 26' has a body or main portion 45 which is fitted with a cap or closure 46. The cap 46 is provided with a pair of openings, and a first quick-disconnect coupling element 26a is mounted in one of the openings while a second quick-disconnect coupling element 26b is mounted in the other of the openings. Each of the coupling elements 26a,26b is complementary to the two coupling elements 23a,24a. Thus, either of the coupling elements 26a,26b can form a connection with either of the coupling elements 23a,24a. The coupling elements 26a,26b have respective coupling portions 47,48 on the outside of the container 26' and respective stems 49,50 on the inside of the container 26'. The coupling portions 47,48 of the coupling elements 26a,26b are designed to mate with the coupling portions 35,36 of the coupling elements 23a,24a.

A hose or section of tubing 51 is mounted on the stem 49 of the coupling element 26a and extends to a location near the bottom of the container 26'. A non-illustrated hose or section of tubing may be mounted on the stem 50 of the coupling element 26b but should terminate in the upper portion of the container 26'.

Figure 9:
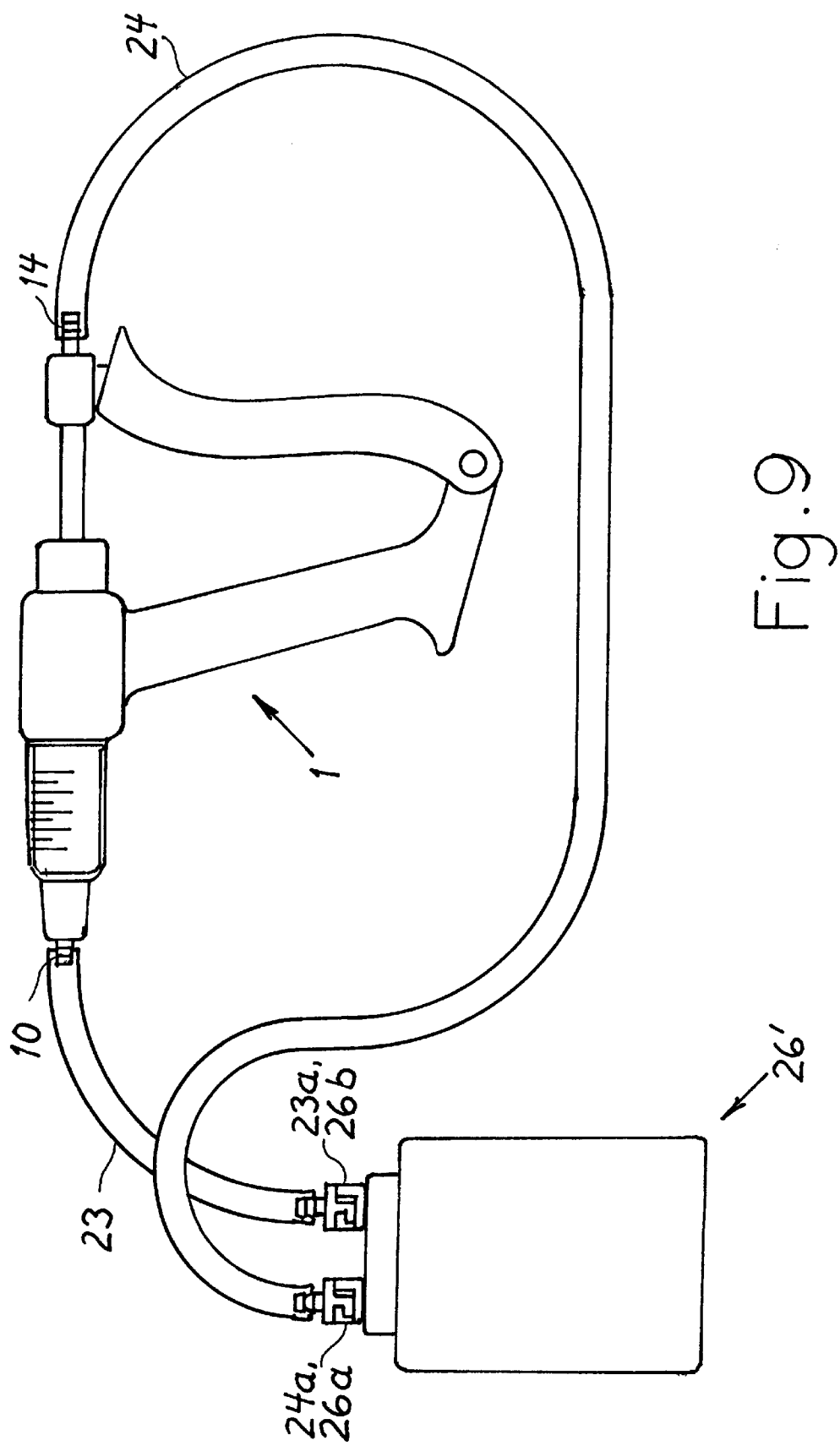
FIG. 9 illustrates a pump constituting part of the kit of FIG. 6 being primed from the hydraulic fluid container of the kit.

The container 26' is designed so that the pump 1 can be primed with hydraulic fluid from the container 26'. This is illustrated in FIG. 9.

To prime the pump 1, the coupling element 23a is inserted in one end of the tubing 23 and the outlet 10 of the pump 1 in the other end of the tubing 23. Similarly, the coupling element 24a is inserted in one end of the tubing 24 and the inlet 14 of the pump 1 in the other end of the tubing 24. The container 26' is filled with hydraulic fluid and the coupling element 23a is connected to the coupling element 26b of the container 26' while the coupling element 24a is connected to the coupling element 26a of the container 26'. The pump 1 is now operated so that hydraulic fluid is drawn from the container 26'. The hydraulic fluid enters the pump 1 by way of the inlet 14 and flows through the pump 1 to the outlet 10 to be discharged back into the container 26'.

Once the pump 1 has been primed, the coupling element 23a is disconnected from the coupling element 26b. Assuming that a hydraulic system is to be pressure bled through a bleed valve of a servo cylinder as shown in FIG. 2, the coupling element 30a (FIG. 6) is inserted in one end of the tubing 30 and the fitting 31 is mounted on the other end of the tubing 30 via the connector 32. The fitting 31 is placed over the bleed valve, and the coupling element 23a of the tubing 23 is connected to the coupling element 30a of the tubing 30. The pump 1 is then able to pressure bleed the hydraulic system with hydraulic fluid from the container 26'.

Figure 10:
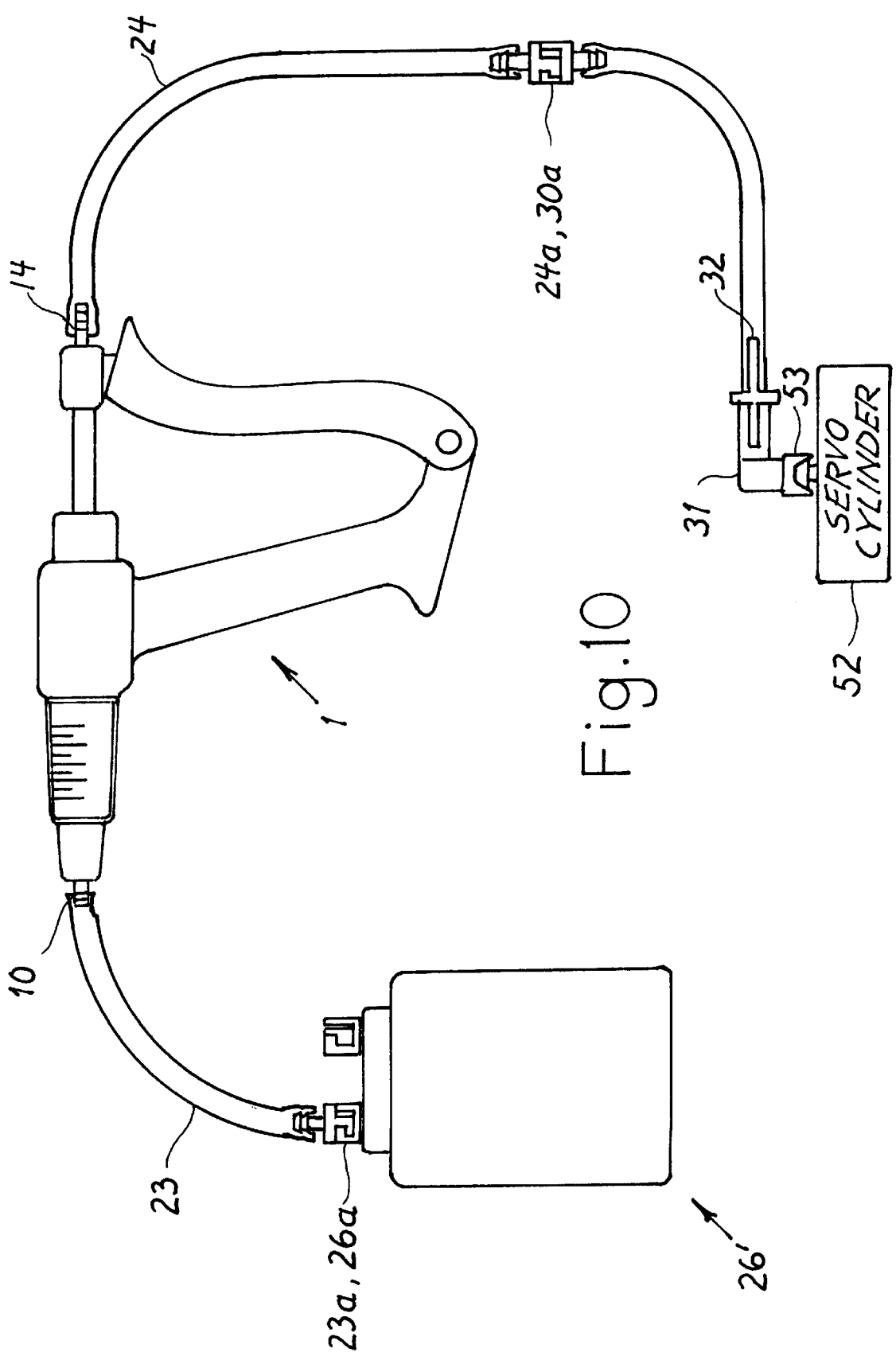
FIG. 10 shows the pump of FIG. 6 in use for the vacuum bleeding of a hydraulic system.

If this hydraulic system, or another hydraulic system, is to be vacuum bled, the coupling element 23a is disengaged from the coupling element 30a and the coupling element 24a of the tubing 24 is disengaged from the coupling element 26a of the container 26'. With reference to FIG. 10 where a servo cylinder of a hydraulic system to be bled is denoted by 52, the fitting 31 is placed over a bleed valve 53 of the servo cylinder 52. The coupling element 23a of the tubing 23 is connected to the coupling element 26b of the container 26' whereas the coupling element 24a of the tubing 24 is connected to the coupling element 30a of the tubing 30. The inlet 14 of the pump 1 is now connected, by way of the tubing 24 and the tubing 30, to the bleed valve 53. On the other hand, the outlet 10 of the pump 1 is connected to the container 26' via the tubing 23. Operation of the pump 1 accordingly creates suction at the bleed valve 53 thereby causing hydraulic fluid to be evacuated from the associated hydraulic system. The hydraulic fluid withdrawn from the hydraulic system is pumped into the container 26'.

Hydraulic systems having a master cylinder and a reservoir for the master cylinder may sometimes need to be pressure bled through an opening in the reservoir. The adapter 41 of the kit 29 not only makes it possible for the pump 1 to bleed a hydraulic system in this manner but also allows the pump 1 to be adapted to openings of different size. Thus, the pump 1 can be used to bleed a series of hydraulic systems having openings of varying size.

Figure 11:
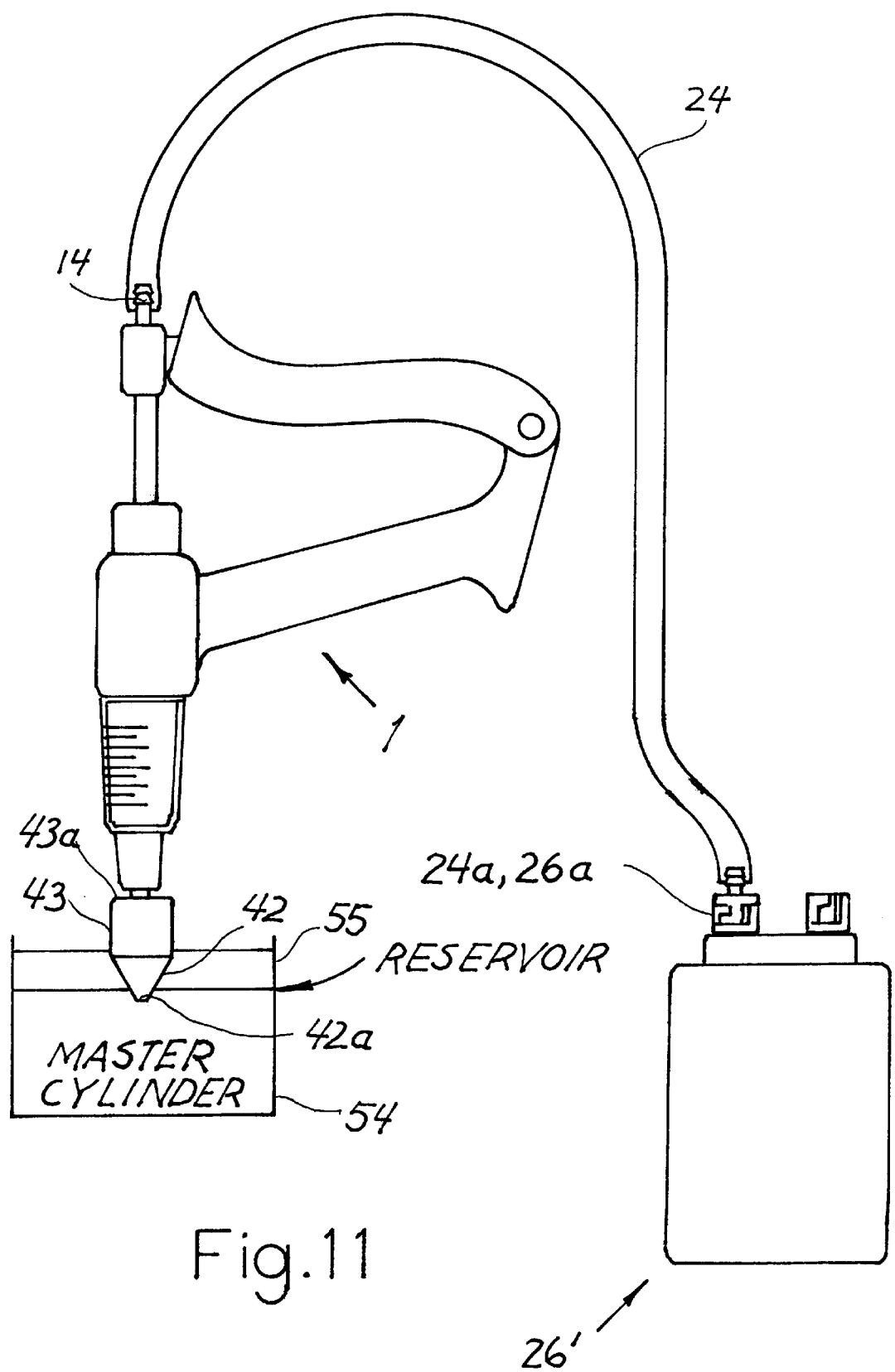
FIG. 11 illustrates the pump and adapter of FIG. 6 in use for the pressure bleeding of a hydraulic system.
Figure 12:
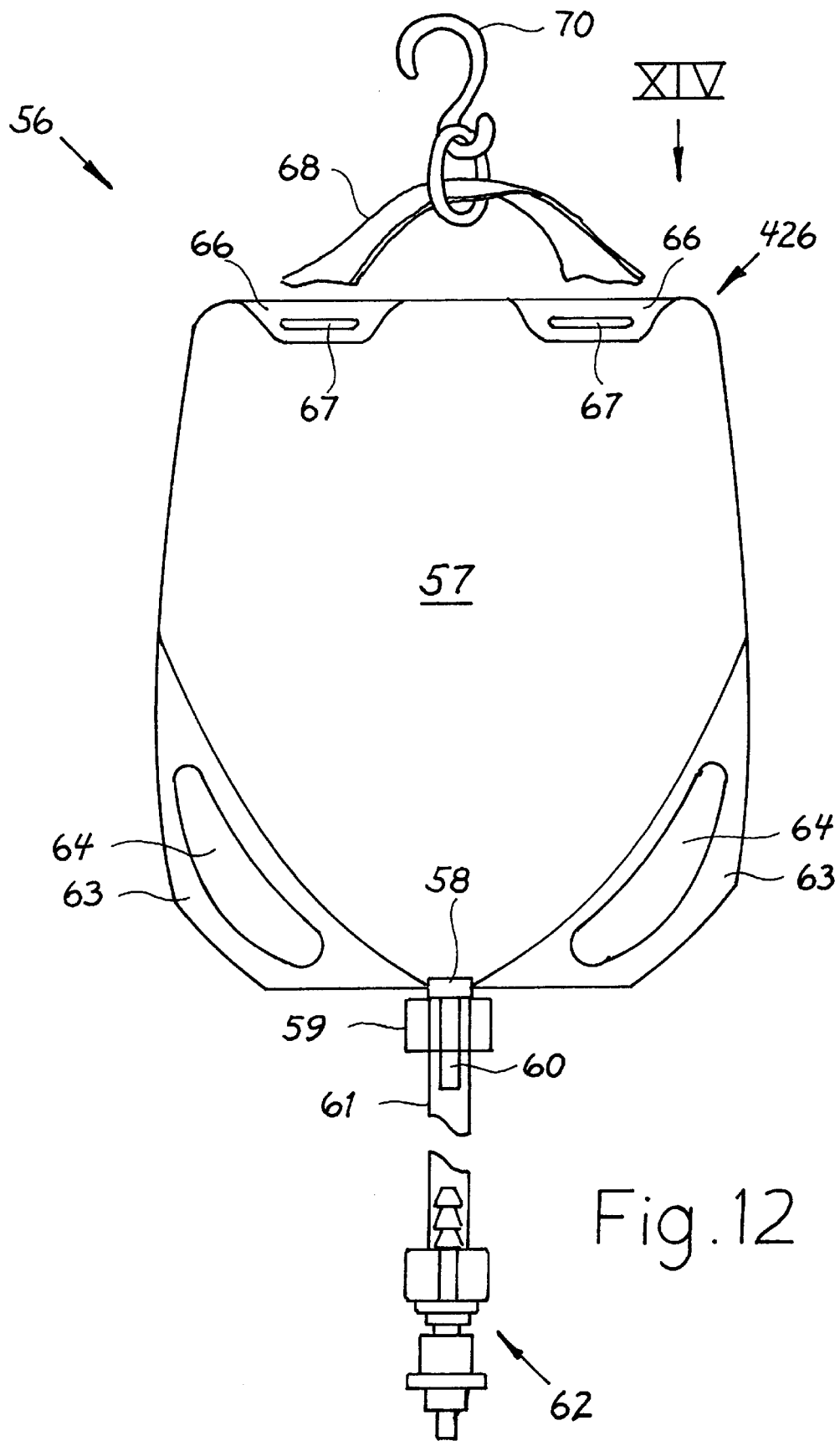
FIG. 12 is a plan view of one more embodiment of a hydraulic fluid container.

Considering FIG. 11 in conjunction with FIG. 6, a master cylinder of a hydraulic system is identified by the numeral 54 and a reservoir for the master cylinder by the numeral 55. The bottom of the reservoir 55 is provided with an opening which establishes communication between the reservoir 55 and the master cylinder 54.

Assuming that the hydraulic system is to be pressure bled via the opening at the bottom of the reservoir 55, the tubing 23 is removed from the outlet 10 of the pump 1. The tubing 24, which is mounted on the inlet 14 of the pump 1, is connected to the container 26' by way of the coupling elements 24a,26a.

The adapter 41 is placed on the outlet 10 of the pump 1 so that the end face 43a of the adapter 41 faces, and the end face 42a of the adapter 41 faces away from, the pump 1. The pump 1 is positioned with the outlet 10 and the adapter 41 directed downward, and the resilient frustoconical portion 42 of the adapter 41 is inserted in the opening at the bottom of the reservoir 55. Due to the taper of the frustoconical portion 42, the frustoconical portion 42 can pass through the opening partway and thereupon make contact with the bottom wall of the reservoir 55 peripherally of the opening. This enables the frustoconical portion 42 to establish a good seal with the bottom wall. Operation of the pump 1 now allows the hydraulic system to be pressure bled with hydraulic fluid from the container 26'.

The taper and resilience of the frustoconical portion 42 also permits the frustoconical portion 42 to adapt to openings of different size.

The kit 29 enables the pump 1 to be primed easily and conveniently. Moreover, the kit 29 makes it possible to readily switch the pump 1 between a condition in which the pump 1 pressurizes a hydraulic system and a condition in which the pump 1 suctions a hydraulic system. Furthermore, the kit 29 allows the pump 1 to be adapted to openings of different size so that the pump 1 can be used for a variety of hydraulic systems.

The kit 29 is not limited to the items shown in FIG. 6. For instance, the kit 29 can include one or more connectors in addition to the connector 32, and the additional connector or connectors may be of different size than the connector 32. Similarly, the kit 29 can comprise one or more fittings besides the fitting 31, and the additional fitting or fittings may be of different size than the fitting 31. The kit 29 can also include a harness for the container 26', a set of instructions for the operation and maintenance of the pump 1, and a carrying case.

In the containers 26,26', air pockets can form as hydraulic fluid is withdrawn. This is undesirable inasmuch as hydraulic fluid tends to deteriorate in the presence of air.

FIGS. 12–15 show a hydraulic fluid packet or package 56 which makes it possible to inhibit the formation of air pockets.

The hydraulic fluid packet 56 includes a container 426 which comprises a pouch or receptacle 57. The pouch 57 confines a body of hydraulic fluid and is made of a flexible material, e.g., polyvinyl alcohol. One end of the pouch 57 has an outlet in the form of a neck 58, and a cap or closure 59 is seated on the neck 58. The neck 58 is centrally disposed with respect to the width of the pouch 57. The cap 59 is provided with a spout 60 which permits a stream of hydraulic fluid to flow out of the pouch 57. A hose or section of tubing 61 is fitted on the spout 60, and the end of the hose 61 remote from the spout 60 carries a coupling element 62. The coupling element 62 is complementary to the coupling elements 23a,24a of the kit 29.

On either side of the pouch 57 is a thin fin or projection 63. Each of the fins 63 extends lengthwise of the pouch 57 from the neck 58 to a location approximately midway between the neck 58 and the end of the pouch 57 remote from the neck 58. The fins 63 are provided with cutouts 64 designed to receive the fingers of a hand, and the fins 63 constitute handles for carrying the pouch 57.

The end of the pouch 57 remote from the neck 58 is provided with a pair of recesses or depressions 65. A ridge or rib 66 extends across each of the recesses 65, and the ridges 66 are formed with slotted openings 67. A flexible element 68 such as a belt or strap passes through the slotted openings 67 and is held on the ridges 66. The flexible element 68 carries a ring 69, and a hook 70 is mounted on the ring 69.

In use, the container 426 is suspended with the neck 58 of the pouch 57 facing down by attaching the hook 70 to a suitable object. Hydraulic fluid is then withdrawn from the pouch 57, e.g., by connecting the spout 60 to the pump 1 and operating the latter. As hydraulic fluid is evacuated from the flexible pouch 57, the pouch 57 collapses onto the remaining hydraulic fluid. This inhibits the formation of an air pockets in the pouch 57 thereby limiting exposure of the hydraulic fluid to air.

Figure 16:
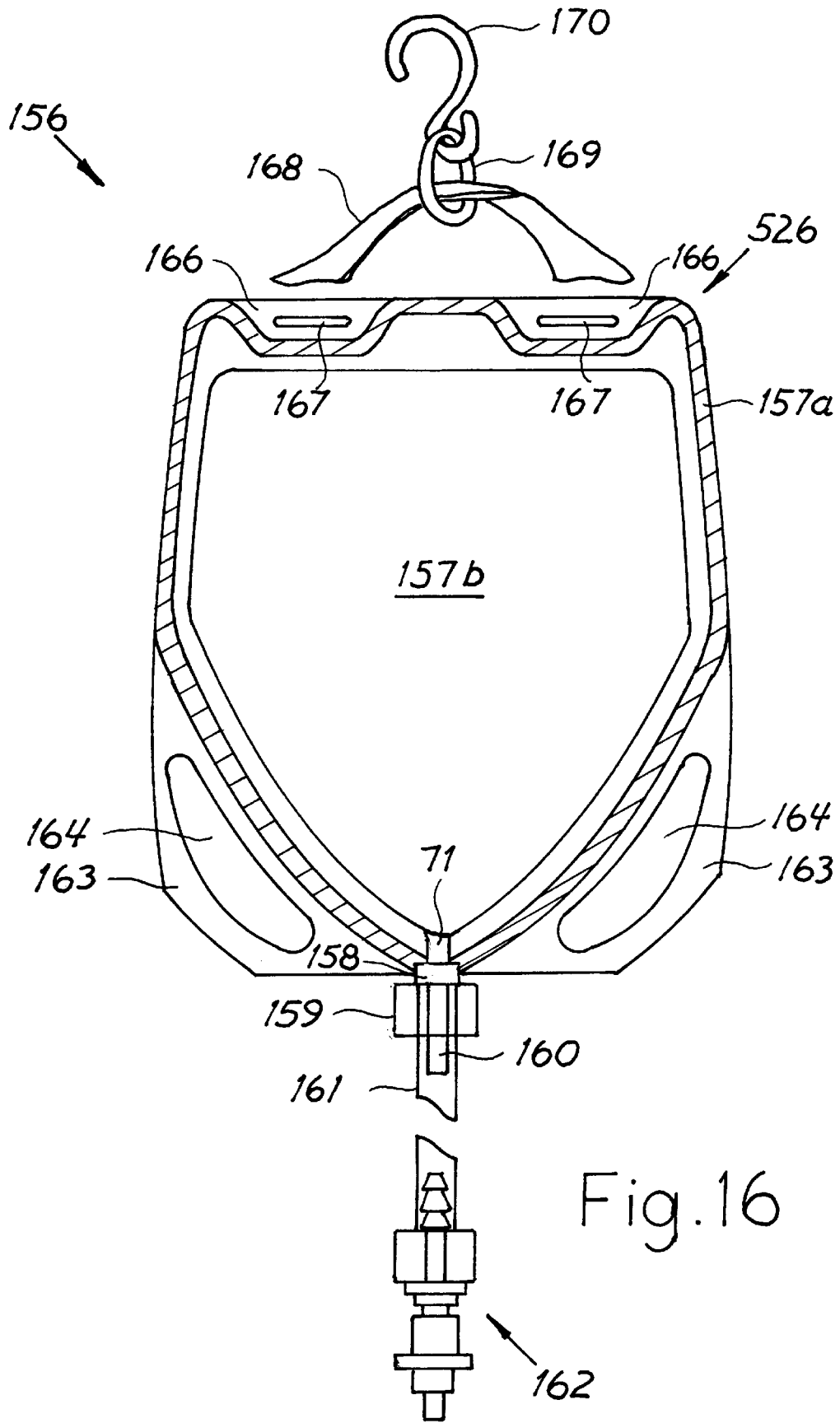
FIG. 16 is a partly sectional plan view of yet another embodiment of a hydraulic fluid container.

FIG. 16 shows a hydraulic fluid packet or package 156 having a shape which resembles that of the hydraulic fluid packet 56. In FIG. 16, the same reference numerals as in FIGS. 12–15 plus 100 are used to denote similar elements.

The hydraulic fluid packet 156 includes a container 526 which comprises an outer receptacle 157a and a pouch or inner receptacle 157b. The outer receptacle 157a is identical to the pouch 57 of the hydraulic fluid packet 56 except that the flexible material of the pouch 57 is replaced by a rigid shell or skin.

The pouch 157b is disposed internally of the outer receptacle 157a and is made of a flexible material. The pouch 157b, which contains a body of hydraulic fluid, is provided with a spout 71 which fits snugly in the neck 158 of the outer receptacle 157a.

The hydraulic fluid packet 156 is used in the same manner as the hydraulic fluid packet 56.

Figure 17:
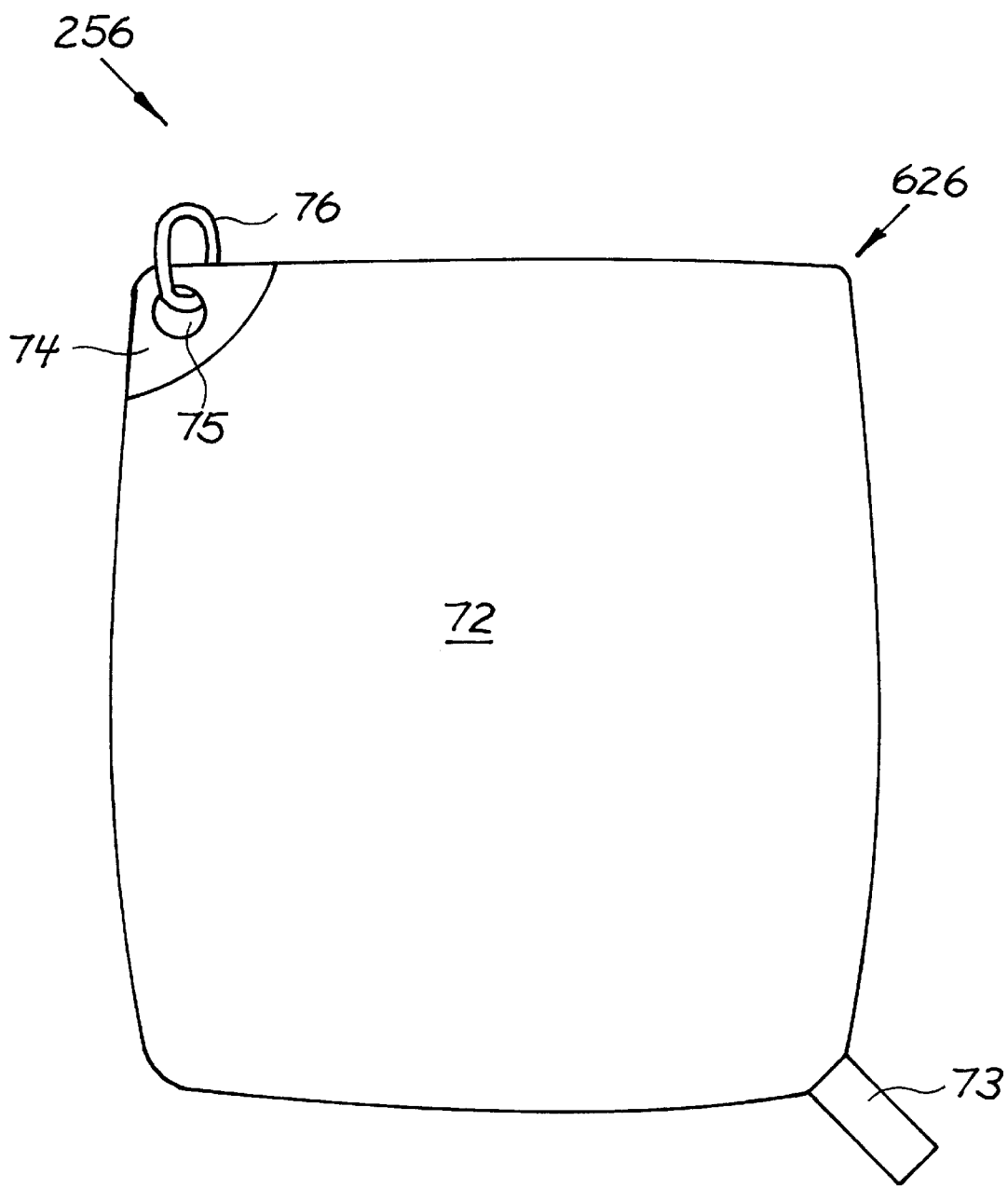
FIG. 17 is a plan view of an additional embodiment of a hydraulic fluid container.

FIG. 17 illustrates a hydraulic fluid packet or package 256 which comprises a generally rectangular container 626. The container 626 includes a flexible pouch or receptacle 72 which confines a body of hydraulic fluid. The pouch 72 is provided with a spout 73 which is located at one corner of the container 626. A thin, approximately triangular fin or extension 74 extends from the pouch 72 at the diametrically opposite corner of the container 626. The fin 74 is formed with an opening 75, and a ring 76 passes through the opening 75 and is held on the fin 74. The ring 76 allows the hydraulic fluid packet 256 to be suspended at the respective corner.

The operation of the hydraulic fluid packet 256 is similar to that of the hydraulic fluid packet 56 or the hydraulic fluid packet 156.

The pouches 57,157b,72 are preferably airtight or impermeable to air. Furthermore, the interiors of the pouches 57,157b,72 are advantageously essentially free of uncombined oxygen.

The hydraulic fluid packets 56,156,256 can form part of a kit such as the kit 29.

The hydraulic fluid packets 56,156,256 make it possible to inhibit the formation of air pockets which can cause deterioration of hydraulic fluid.

Various modifications in addition to those described above can be made within the meaning and range of equivalence of the appended claims.

What is claimed is:

1. An arrangement for removing contaminants from a hydraulic system comprising:

a portable fluid conveying device for introducing fluid into the hydraulic system, when the device is connected to the hydraulic system in a first configuration, and for evacuating fluid from the hydraulic system, when the device is connected to the hydraulic system in a second configuration; and a resilient adapter capable of conforming to openings of different size in the hydraulic system and provide a sealed fluid connection between said device and the hydraulic system to allow the device to introduce fluid into the hydraulic system while said sealing fluid connection is being maintained.

2. The arrangement of claim 1, wherein said resilient adapter has a frustoconical end portion.

3. The arrangement of claim 2, wherein said resilient adapter further has an annular portion fast with said frustoconical portion.

4. The arrangement of claim 3, wherein said device has a chamber, and means for fixing the volume of said chamber at different values.

5. The arrangement of claim 2, wherein said device has a chamber, and means for fixing the volume of said chamber at different values.

6. The arrangement of claim 1, wherein said device has a chamber, and means for fixing the volume of said chamber at different values.

7. A method for removing contaminants from a hydraulic system comprising the following steps:

providing a portable fluid conveying device for introducing fluid into the hydraulic system through a first sealed fluid connection between the device and the hydraulic system, when the device is connected to the hydraulic system in a first configuration, and for evacuating fluid from the hydraulic system through a second sealed fluid connection between the device and the hydraulic system, when the device is connected to the hydraulic system in a second configuration;

providing a resilient adapter capable of conforming to openings of different size in the hydraulic system;

applying the resilient adapter to an opening in the hydraulic system to provide said first sealed fluid connection between said device and the hydraulic system; and introducing fluid into the hydraulic system to remove contaminants therefrom.

8. The method of claim 7, wherein said resilient adapter has a frustoconical end portion.

9. The method of claim 8, wherein said resilient adapter further has an annular portion fast with said frustoconical portion.

10. The arrangement of claim 9, wherein said device has a chamber, and means for fixing the volume of said chamber at different values.

11. The arrangement of claim 8, wherein said device has a chamber, and means for fixing the volume of said chamber at different values.

12. The method of claim 7, wherein said device has a chamber, and means for fixing the volume of said chamber at different values.

\* \* \* \* \*